United States Patent Office 3,211,553

Patented Oct. 12, 1965

3,211,553

PRESENSITIZED POSITIVE-ACTING DIAZOTYPE PRINTING PLATE

Jack J. Ito, Roseville, Minn., assignor to Minnesota Mining and Manufacturing Company, St. Paul, Minn., a corporation of Delaware No Drawing. Filed Feb. 19, 1964, Ser. No. 345,848
11 Claims. (Cl. 96—75)

This application is a continuation-in-part of parent application Serial No. 65,892, filed October 31, 1960, now abandoned.

The present invention relates to a new improved presensitized positive-acting lithographic sheet construction. One preferred aspect of my invention relates to a metal lithographic plate having a well-bonded stable light-sensitive surface coating on which an organophilic ink-receptive printing image is formed by exposure of the plate surface to actinic light through a positive transparency, even weeks or months after manufacture of the plate, the printing image being "developed" by ready removal of the light-decomposed coating in the light-struck areas to bare an underlying hydrophilic treated metal surface. A second aspect concerns lithographic sheets suitable for use as positively-acting color proofing films.

The image areas of the exposed and developed sheets hereof, appropriately colored for use as a proofing film or selectively ink-receptive water-repellant for use as a lithographic plate, thus corresponds with the opaque areas of the transparency, while the non-image areas, transparent and colorless for use as a proofing film or selectively water-receptive ink-repellant for use as a lithographic plate, correspond with the light-transmissive areas of the transparency. That is, the sheets hereof are positive-acting in contradistinction to negative-acting lithographic sheets or plates, in which the image areas of the developed sheet correspond with the light-transmissive areas of the transparency and the non-image areas correspond with the opaque areas of the transparency.

Positive-acting lithographic plates of one sort or another have long been known. For various well-known reasons many lithographers prefer them to negative-acting plates. By far the bulk of the commercial positive-acting plates have not been presensitized—but instead have been plates typified by the so-called "deep-etch" plates wherein the lithographer must go through the expensive time-consuming, tedious, skill-requiring operations of preparing and sensitizing the metal sheet (usually deeply grained) himself. This is true in spite of the fact that truly presensitized dimensionally stable negative-acting metal lithographic plates have now been in wide usage for nearly a decade; with the advent of the structures described in Jewett and Case Patent No. 2,714,066, granted July 26, 1955, on original application filed December 6, 1950. These negative-acting plates can be shipped in commerce in their light-sensitive state, stored for example in the lithographers' shops and then used weeks or months later. All the lithographer need to do is expose, develop, and use the plate—he need not make it. However, no one, to my knowledge, has filled the gap in the commercial sense by providing the lithographer with a presensitized dimensionally stable positive-acting printing plate which can be employed in long press runs, and in which exact high quality reproduction of the original is obtained.

Positive-acting plates have not been known which utilize paper backings coated with some plastic material to provide a smooth printing surface. See Herrick et al. Patent No. 2,772,972, granted December 4, 1956. Lithographic plates made from such backing materials are not dimensionally stable where long press runs are required, particularly for the accurate registration necessary in high quality color printing. Sensitized plastic coatings applied to metal backings also are known, but there is marked tendency of the plastic to weaken resulting in rapid image breakdown. On the other hand, although metal sheets provide backings which are dimensionally stable, heretofore it has been necessary to employ a rather highly grained sheet in a presensitized metal positively-acting printing plate. Where a highly grained surface is employed, particularly in color-work, faithful reproduction usually depends on critically precise ink-water balance on the press. Initial edge portions of half tone dots tend to wear away disproportionately fast yielding an undesirable change in image as press run proceeds, known as dot sharpening, with consequent loss in tone value of the prints.

More recently, smooth surface positive-acting metal backed presensitized lithographic plates have been marketed, in which the light-sensitive material appears to be a diazooxide. These plates have the disadvantage of being useful in only relatively short press runs because of poor adhesion of the image to the plate backing.

In accordance with the present invention, a positive-acting printing plate results which is presensitized, that is, which can be stored for weeks or months and then used. It is dimensionally stable so as to give accurate registration. The printing characteristics of the plate are particularly desirable because of high image adhesion and the absence of sharpening or loss of tone value, the image remaining uniform until final breakdown after long press runs. Exposure and development is simple, requiring no special equipment and only common readily available processing materials.

As a specific illustration, the plate of the present invention comprises a metal sheet such as aluminum having on one surface thereof an interaction product of the surface of the aluminum with phosphotungstic acid or equivalent material having a heteropoly-complex or isopoly-complex oxygenated anion. Overlying the interaction product is a well-bonded insoluble light-sensitive phosphotungstate diazonium salt of diazo material such as a light-sensitive diazo-resin. Upon exposure of the plate through a positive original, the diazo material undergoes a reaction by which the insoluble diazonium salt is broken down, allowing the materials in the light-struck area readily to be removed by the use of appropriate solvent systems. In the non-light-struck areas, the remaining material is insoluble and selectively ink-receptive (organophilic) and water-repellant (hydrophobic). The image is firmly bonded to the metal, probably by some chemical bond (but possibly by some physical phenomenon), through the poly-complex-metal interaction product. Although the image is still light-sensitive, a suitable printing image is nonetheless provided, and additionally, in preferred embodiments hereof, the image can be readily converted to a non-light-sensitive character which withstands long press runs yielding many thousands of faithful reproductions even in multi-color work requiring precise registration. The surface of the plate preferably is smooth, yielding highly accurate reproduction even with very fine half-tone originals.

The phosphotungstic acid is a member of a class of compounds which provide a poly-complex oxygenated anion. These compounds are formed from the weak acids of certain amphoteric metals. These weak acids are characterized by the ease with which they condense to form anions containing several molecules of the acid anhydride. They may be condensed to form an anion containing only one type of acid anhydride, in which case they are known as isopoly acids, or more specifically compounds having an isopoly-complex oxygenated anion.

They may be condensed with other acids, in which case they form heteropoly acids, that is, compounds having a heteropoly-complex oxygenated anion, of which phosphotungstic acid is typical.

The amphoteric metals of the poly-complex compounds are shown positioned to the left side of Groups V and VI of current forms of Mendeléeff's Periodic Table of the Elements. Leading text books of which I am aware dealing with the poly-complex compounds enumerate the amphoteric metals thus grouped as being from Groups Va and VIa of the Periodic Table; see: "Modern Aspects of Inorganic Chemistry," second edition, Emeleus and Anderson, published in 1952 (and reprinted as recently as 1956), by D. Van Nostrand Co., Inc. Other periodic charts based on the Mendeléeff's Table seem to group these same elements under Groups Vb and VIb; see: "General Inorganic Chemistry," Sneed and Maynard, published 1942 by D. Van Nostrand Co., Inc. For convenience, and to remain as consistent as possible with leading text books on the subject, herein these amphoteric metals of which the poly-complex compounds are formed will be referred to as being from Groups Va and VIa of the Periodic Table.

The poly-complex oxygenated anions are formed by the union of varying numbers of acid anhydride units, depending upon the particular metals employed, metal valence state, and the type of physical structure when the anhydride units interassociate. In the heteropoly compound the so-called heterounit is situated (probably centrally) among the anhydride units of the amphoteric metals predominantly present. The heterounit can include various metal-containing units, such as acid anhydrides of the metals. The metals of the hetero-unit may, consistent with the teachings hereinafter set forth, be found in any of most of the various Groups of the Periodic Table.

The heteropoly and isopoly compounds providing the poly-complex oxygenated anions ordinarily are of high solubility in water. They form a highly water-insoluble reaction product with various diazo materials, the reaction taking place through the light-sensitive diazo group to form a complex diazonium salt. Notwithstanding the formation of the stable water-insoluble reaction product, the diazo group retains its light-sensitive character. Thus, upon exposure of the diazonium salt to actinic light, the diazo group is destroyed, and the poly-complex-diazo reaction product broken down. Apparently the poly-complex oxygenated anion material reverts to, or substantially to, its initial soluble character.

It has been previously known that certain heteropoly compounds form some sort of reaction product with various diazo materials. See, for example, Russian Patent No. 51,868, published on or about September 30, 1937. This patent is directed to the discovery that certain diazo compounds can be "stabilized" with heteropolyacids such as phosphomolybdic acid. The resulting material is stated to be so "stable" as to be noncombustible, and can endure prolonged boiling in acids. There is no suggestion in this reference that a useful lithographic plate structure utilizing the same would result. Indeed, there is no indication that any instability such as light-sensitivity existing in the diazo per se would remain in these complex materials. In fact, I have discovered that when the insoluble diazonium salt of the heteropoly or isopoly compound with a light-sensitive diazo mateial is coated in its insoluble state on an aluminum surface, an inoperative lithographic plate results.

To my knowledge, no one has heretofore appreciated the fact that a highly successful lithographic plate having commercial utility results from employing isopoly and heteropoly compounds, in conjunction with light-sensitive diazo materials, in accordance with the principles of the present invention. Heteropoly acids have been used in photochemical processes, however; see Chalkley Patent No. 2,895,892, granted July 21, 1959.

Having now described my invention in a very general way, the following illustrative but non-limiting examples will further describe the same.

*Example I*

Aluminum foil or sheet material of about .005 inch in thickness is first made ready for treatment with phosphotungstic acid. Since greasy lubricants are commonly used in aluminum mills during the rolling operation, it is first desirable to treat the aluminum foil or sheet so as to remove any greasy film, so that the surface exposed will be an aluminum surface. One method which is advantageous in cleaning the aluminum surface is to immerse the same in a 5–10% solution of anhydrous trisodium phosphate for a sufficient time only to clean the aluminum, e.g., for a period of five minutes. The temperature of the solution may be controlled at approximately 160° F. Higher temperatures may be used with a correspondnig reduction in the time of treatment, and lower temperatures may be used with a corresponding increase in the time of treatment; and other solution concentrations may be used, if desired. The cleaning or degreasing of the aluminum foil or sheet material in the manner outlined above will often develop a black scum or residue on the surface of the aluminum (which probably consists primarily of oxides and hydroxides of alloyed metals) which must be either thoroughly wiped or washed away mechanically or dissolved in an acid solution, such, for example, as concentrated nitric acid. To remove any scum and to leave the surface in good condition for the subsequent steps of the plate-making operation, a treatment of the plate surface in nitric acid of about 70% concentration is employed. After treatment with the acid solution, the aluminum foil or sheet material is thoroughly spray-rinsed with warm water. It can also be rinsed with cold water, but in that instance it is desirable to allow the sheet to stand overnight (probably to become superficially oxidized by the air) before subsequent treatments are applied. Where a warm water rinse is employed, subsequent treatment can immediately follow drying of the plate.

The aluminum foil or sheet just described is of quite a smooth character and usually has a metallic sheen or relatively smooth appearance, as contrasted with the dull appearance of various prior art grained plates. While some very slight amount of etching may occur on the aluminum surface of the sheet during the cleaning operation, this is so small that it does not impart to the sheet a rough surface or a matte appearance. This is important in securing the highest performance characteristics, sought after in finished presensitized lithographic plates, particularly where fine line work or fine half-tones are being reproduced.

The sheet is next treated with a solution of phosphotungstic acid, which can be applied to the cleaned surface by a roll coating, dip coating, or whirl coating. The coating may be applied at room temperature. Running the sheet in pressure contact with a rotating rubber roller, which is wet with aqueous phosphotungstic acid, applies a thin continuous coating of the phosphotungstic acid over the surface.

The poly-complex oxygenated anion, in this instance the anion of phosphotungstic acid, at the metal surface forms some insoluble interaction product with the metal, an excess of water-soluble coating also remaining. The interaction product (if the excess is washed away for purposes of examination) is hydrophilic, and further is invisible and extremely thin, perhaps only monomolecular in thickness. In making the plate of the present example the excess is not washed away. It is preferred that the phosphotungstic acid coating be of the order of 5–10 mg./sq. ft. (dry basis) of plate area, although the amount is not particularly critical, and more or less phosphotungstic acid will give satisfactory results so long as some soluble excess in the coating remains.

The phosphotungstic acid is a readily available commercial product, and can be obtained for example, from Merck and Co., Rahway, New Jersey, or from Sylvania Electric Products, Inc. (Chemical and Metallurgical Division), Towanda, Pa.

Soon, e.g., within an hour of two, after the application of the phosphotungstic acid, a solution of a light-sensitive diazo resin or equivalent is coated over the phosphotungstic acid surface of the sheet. A preferred diazo resin is the hexafluorophosphoric acid salt of the condensation resin product of p-diazodiphenyl amine and formaldehyde. The condensation resin can be prepared, for example, in accordance with the method described in Jewett and Case Patent No. 2,714,066. A solution of the pure diazo resin in water, for example 300 parts resin dissolved in 5500 parts water, is made up. To this solution is then slowly added with stirring 210 parts of 65% hexafluorophosphoric acid dissolved in 800 parts water. A yellow precipitate forms which is filtered out and washed repeatedly in water until the pH of the wash water is about 4.0–4.5. The precipitate is then dissolved in a solvent system consisting of 80 parts acetone and 20 parts water, a dilute solution, e.g., a 0.3% solution by weight, being preferred.

The preparations of the light-sensitive diazo resin are carried out under subdued light, for example, under a yellow light. This is also true of the other operations involving the coating of the sheet with the light-sensitive resin and subsequent handling of the presensitized sheet prior to exposure and development.

The solution of the light-sensitive diazo resin just described may be applied over the phosphotungstic acid layer by reverse roll-coating or by dipping the sheet into the solution of the resin. It is preferred that the diazo coating be a thin one, a residue of about 6–8 milligrams of the diazo resin per square foot of plate area being satisfactory, although the precise amount is not particularly critical. The plate is then dried at room temperature, or at slightly elevated temperatures if desired, and then can be converted into standard plate sizes, packed in suitable light-proof containers and shipped in commerce.

The plate can be stored for weeks or months in its sensitized condition, and then be used as successfully as immediately following manufacture.

As the diazo coating is applied, it becomes mixed with the excess phosphotungstic acid or equivalent present and reacts therewith to form in situ a complex diazonium salt on the plate surface. The salt is highly insoluble in water and in common organic solvents (including the acetone-water solution from which the diazo initially was applied). It is organophilic and hydrophobic, rendering the entire surface of the plate ink-receptive and water-repellant.

In use, the presensitized plate is exposed through a positive transparency under a source of ultraviolet light. Carbon arcs are preferred, and exposure time of 1 to 2 minutes employing a 140 amp carbon arc at a distance of 3 ft. yields good results. Lesser or greater exposure times may be required for special types of jobs, with different types of illumination, all in accordance with the known procedures.

The exposed areas of the plate, corresponding with the transparent or background areas of the transparency, are either colorless or, where heavy coatings of the diazo resin were employed, very light blue.

Upon exposure, the diazonium salt of the phosphotungstic acid is degraded due to destruction of the light-sensitive groups, the phosphotungstic acid reverting or substantially reverting to its initially water-soluble character. Although the light-decomposed diazo portion of the degraded salt apparently is insoluble, it is believed to be in some way dispersed in the phosphotungstic acid portion of the degraded salt. In any event, following exposure of light struck portions of the light-sensitive coating are readily removed upon wiping with a developing solution of two parts of n-propyl alcohol and one part water (by volume), thus baring the underlying hydrophilic treated surface of the aluminum. The non-light-struck image areas (which will take ink on the press) remain. The plate can then be mounted on a press for printing. However, the plate preferably is first coated with a suitable image developer, such as a pigmented resin emulsion, which will adhere to, make visible, and protect and reinforce the image. The image developer may take any of various forms, such as that disclosed in Hall Patent No. 2,754,279, granted July 10, 1956.

While the present example illustrates basic rudiments of my invention, and provides a satisfactory presensitized plate, further advantages obtain when the plate is made in accordance with the following example.

*Example II*

An aluminum foil is cleaned and treated with phosphotungstic acid as described in Example I. A light-sensitive diazo solution is prepared having the following composition:

| | Parts by weight |
|---|---|
| Polyvinyl hydrogen phthalate resin (solid) having a phthalyl content of about 70% and an intrinsic viscosity in pyridine of about 1.15 (available from Distillation Products, Inc., Rochester, New York, as "Eastman Organic Chemical No. 5527") | 2.5 |
| Hexafluorophosphoric acid salt of the diazo compound formed by the condensation of p-diazodiphenyl amine with formaldehyde | 0.42 |
| "Orasol Black B" dye (a mono azo dye available from Ciba Co., Inc., Skokie, Ill.) | 0.36 |
| 4-phenylazodiphenyl amine indicator (available from Distillation Products, Inc., Rochester, N.Y.) | 0.13 |
| Methyl ethyl ketone | 87 |
| Acetone | 2 |
| Water | 1 |
| Diacetone alcohol | 6 |

The diazo resin is dissolved in the acetone and water. The polyvinyl hydrogen phthalate resin is dissolved in roughly one-half of the methyl ethyl ketone following which the diacetone alcohol is stirred therein. The "Orosol" dye and the indicator are dissolved together in the remaining portion of the methyl ethyl ethyl ketone and the solution filtered. The first two mentioned solutions are then mixed with stirring, and the dye solution added thereto while stirring continues until a homogeneous solution-mixture is obtained.

The sensitizer solution just described is applied to the phosphotungstic acid coated aluminum surface in the same fashion as described in Example I. Exposure of the sheet is the same. Upon exposure through the positive transparency, the exposed areas turn a deep purple due to a color change in the indicator apparently resulting from some action thereon by the light decomposition products. A high contrast between the light-struck and non-light-struck areas is thus offered, rendering the image clearly and readily visible without further treatment. For this reason adjacent areas of a plate can be successively exposed without danger of inadvertent overlap and double exposure, as might occur if the image were not readily visible.

The exposed image is then rubbed, for example with a cotton swab, wet with the alcohol-water developing solution above described, at which time the exposed diazo (and other components applied with the diazo coating) and the soluble phosphotungstic acid are removed.

Extremely faithful reproduction of the image areas, even with the finest of half-tone originals, occurs. The image areas are reinforced by the polyvinyl hydrogen phthalate resin in the interest of longer press life. While the plate can be mounted on the press at this time to print, the image area is still light-sensitive and in order to render the plate immune to actinic light, it is advantageous to render the image areas insensitive to light. It has been discovered that this can be readily accomplished by treating the image with a dilute (e.g., a 0.1 percent) solution of a basic dye such as Quinaldine Red (available from Distillation Products, Inc., Rochester, New York), in a solvent system comprising one part n-propyl alcohol, one part water, and one-fifth part acetone, all by volume. The dye solution can be poured onto the image surface of the plate and allowed to remain for 30–60 seconds or, conversely, by dipping the plate into the dye solution. The solution is then wiped off with a dry cloth and the plate dried. Through this very simple treatment, by some reaction not completely understood, the dye in some way seems to react to form an extremely insoluble light-insensitive residue in the image (originally non-light-struck) areas. A very durable image results, yielding long press life. It is not unusual to obtain about 50,000 faithful half-tone copies particularly when optimum press settings are employed.

The previous examples illustrate the manufacture of a presensitized lithographic plate in accordance with my invention employing phosphotungstic acid as the material providing the poly-complex oxygenated anion, specifically a heteropoly-complex oxygenated anion. Various other materials providing a heteropoly-complex oxygenated anion can be employed. Successful presensitized positive-acting lithographic plates can be prepared using the poly-complex oxygenated anions of such heteropoly acids as arsenotungstic acid, vanadotungstic acid, manganotungstic acid, germanotungstic acid, phosphomolybdic acid, vanadomolybdic acid, chromicotungstic acid, telluromolybdic acid, silicotungstic acid, and phosphovanadic acid. The acids themselves, when soluble, can be used as well as simple salt forms which are soluble. It will be seen that the predominating metals in the anions all are found in Group Va or Group VIa of the Periodic Table. In some instances it is possible, and may even be desirable, that a plurality of metals form the predominating metal in the complex oxygenated anion. Such a compound, such as phosphovanadicotungstic acid, can be considered as if one of the metals from Group Va or VIa has replaced a portion, but less than all, of the other predominate metal; the vanadium thus being considered as having replaced or substituted for some of the tungsten (or vice versa) in the phosphovanadicotungstic acid.

In selecting a heteropoly-complex material, some care should be selected as to which metals are utilized as the hetero atom, namely those which do not so influence the complex anion as to preclude the same from forming an insoluble complex diazonium salt with the diazo material. Various suitable hetero metals are shown above and include phosphorus, arsenic, manganese, germanium, and silcon. Where other hetero atoms or metals are considered, the suitability of the same can be readily ascertained simply by forming the heteropoly compound and mixing it in water with a water-soluble form of diazo material to determine whether an insoluble precipitate of diazonium salt rapidly forms. By and large I have found that if a given heterpoly compound forms an insoluble diazonium salt with a water-soluble diazo, it is suitable generally in the practice of my invention.

Isopoly compounds are also highly suitable in the practice of my invention, as illustrated in the following example.

*Example III*

An aluminum foil is cleaned as described in Example I. The cleaned sheet is next immersed in a 1% by weight aqueous solution of ammonium paramolybdate for about seven minutes. An excess of the ammonium paramolybdate remains on the sheet after it is allowed to drain dry or is passed through rotating rubber rolls with pressure contact. The ammonium paramolybdate was obtained from the S. W. Shattuck Chemical Company, Denver, Colorado.

A diazo sensitizer is prepared as follows, all parts being by weight: The p-toluene sulfonic acid salt of diazo resin is first prepared by the addition of 10 parts of a 10% aqueous solution of p-toluene sulfonic acid to 50 parts of a 2% aqueous solution of p-diazo diphenylamine-formaldehyde condensation resin, prepared as indicated above in Example I. The reactants are stirred for approximately 15 minutes, and the p-toluene sulfonic acid salt of the diazo separates out as a dark, viscous material. The product is rinsed several times with water, and the water is decanted off. The viscous salt is then dried and 0.42 part thereof is dissolved in 25 parts of methyl alcohol. To the solution is added 35 parts of methyl ethyl ketone and 2.5 parts of polyvinyl hydrogen phthalate. The system is mechanically stirred until the polyvinyl hydrogen phthalate resin is dissolved.

The light sensitive solution just described is applied to the ammonium paramolybdate coated surface in the same fashion as described in Example I. Exposure of the sheet is the same. The exposed areas of the plate corresponding with the transparent or background areas of the plate are colorless or light blue.

The exposed image is then rubbed with a cotton swab wet with the alcohol-water developing solution described in Example I, at which time the exposed diazo and the polyvinyl hydrogen phthalate are removed baring the underlying hydrophilic surface. It is advantageous to apply ink to the unexposed image areas at this time, thus reducing the light sensitivity of the image areas. Or, if desired, the plate may be treated as described in Example II to render the image light insensitive. The plate can then be mounted on the press for printing.

Other isopoly compounds which can be used in place of the isopoly paramolybdate compound of the preceding example are selected from Groups Va and VIa of the Periodic Table, and include the poly-complex anions of isopolyvanadic acid, paratungstic acid, metatungstic acid, and paramolybdic acid. As in the instance of the heteropoly compounds, the isopoly compounds are employed in any soluble form, whether as the acid or salt forms.

Various light-sensitive diazo materials have been found to be suitable in the structures hereof, including those which are either monomeric or polymeric in character. The paradiazodiphenyl amine-formaldehyde condensation resin, which is utilized in making the acid salts employed in the previous examples, by itself, is effective. This condensation resin is water-soluble, and accordingly, the image can be developed after exposure simply with a water solution. Also, although less preferred, the paradiazodiphenyl amine monomer, from which the condensation resin is formed, can be utilized satisfactorily. By and large, diazo compounds which contain no basic groups, or groups only weakly basic, in addition to the diazo groups, are preferred. In those compounds containing relatively strongly basic groups such as primary amino groups, a competitive reaction with the heteropoly or isopoly compound tends to occur to the exclusion of the formation of the diazonium salt of the heteropoly or isopoly compound, rendering these less desirable.

Various metals can be employed in addition to the preferred aluminum. Suitable metal surfaces include chromium, magnesium, and nickel. Additionally, where the present invention is to be used in the preparation of bi-metallic offset plates, photo-engraved letterpress plates, and such like, where the non-light-struck areas serve as a photo resist, other metals such as copper provide suitable surfaces to which the coatings hereof firmly adhere. Some metals tend to reduce or degrade and destroy (for my purposes) the poly-complex oxygenated anion, particularly when the latter is present in solution form on the metal surface. In the instance of aluminum this degradation takes place in a few hours. With certain other metals, notably magnesium, the complete degradation occurs so rapidly as to be almost instantaneous.

Surprisingly, if the diazonium salt of the poly-complex is formed before complete degradation of the poly-complex by the metal, the degradative reaction is essentially terminated, and the plate is stable. Thus it is important that the diazo material come into contact with the heteropoly or isopoly compound on the plate prior to the time substantial degradation of the latter by the metal has occurred. As mentioned in the instance of the phosphotungstic acid and aluminum described in the previous specific examples, ample time is present for the diazo to be coated onto the poly-complex treated plate. With magnesium the diazo cannot be applied quickly enough utilizing the procedures described in the preceding examples. Further procedure has been developed for making the plate with such metals (although the procedure is not confined thereto), to be described in the following example.

*Example IV*

A magnesium sheet is first cleaned by rubbing with pumice and water until the surface, though still smooth, readily wets with water, after which the cleaned sheet is rinsed with water and dried.

To 330 parts of a 3% solution by weight of a water solution of the paradiazodiphenyl amine-formaldehyde condensation resin described above is added 200 parts of a 10% water solution of phosphotungstic acid with stirring. A yellow colored precipitate immediately forms which is removed by filtration. The precipitate is then washed repeatedly in water at least until the pH of the washwater exceeds about 4. After drying, the precipitate is then added to dimethylformamide solvent, wherein it readily dissolves to form a 5% solution by weight, sufficient solvent being employed to yield approximately a 5% solution.

The formation of the precipitate and dissolution of the same takes place under conditions of subdued light, following which, still under subdued light, the solution is coated on the cleaned magnesium sheet. The sheet is then heated to about 150° F. for about ten minutes in order to remove the dimethylformamide solvent. The resulting surface is highly insoluble, and ink-receptive. The plate is stable and can be stored weeks or months before use. It can then be exposed through a positive transparency, and the image developed with the alcohol-water solution generally as above described.

Where the phosphotungstic acid is coated on the magnesium directly, as in the procedures of Examples I and II, degradation of the heteropoly compound occurs so rapidly that even if the diazo material is coated thereover as promptly as possible, an inferior or useless product results. However, by the procedures of the present example, notwithstanding the activity of the metal employed, a useful stable plate results.

As mentioned hereinabove, my invention is also valuable in proofing color separation, half tone camera positives, in connection with color lithography. In color printing, continuous tone color separation negatives are prepared photographically, these respectively representing three or more colors. From each of these, a half tone camera positive is prepared utilizing (i.e. exposing through) a half tone contact screen. A contact negative is frequently then made from each of the camera positives, and from these negatives, printing plates are prepared.

The color separation contact negatives can be proofed by employing negative-acting color proofing films such as are described and claimed in Larson application Serial No. 776,597, filed November 26, 1958, now Patent No. 3,136,637, granted June 9, 1964. However, it is advantageous to be able to proof the photographic work at as early a step as possible. Accordingly, my invention finds applicability in proofing the camera positive directly, without having first to make a contact negative, as must be done where negative acting lithographic sheets are used in proofs.

In the Larson lithographic sheets used in proofing, a pigmented overlayer is employed which bonds to the light-struck areas of the exposed sheet, said layer being removed from the non-light-struck areas during development. It has been discovered that techniques of the present invention can be utilized in providing a pigmented overlayer which bonds in the non-light-struck areas while being removed, with decomposed diazonium salt in the light-struck areas.

The following example illustrated this aspect of the present invention, wherein the poly-complex oxygenated anion-diazonium salt is applied in pre-reacted form from solution (similar to Example IV above).

*Example V*

A 2-mil film of transparent colorless biaxially oriented polyethylene terephthalate polyester is optionally given a corona discharge treatment, sufficient to render the surface of the film hydrophilic. The surface treatment is preferred, and recommended, particularly where slip agents or lubricants (commonly applied by film manufacturers) are present on the film. The treated surface is first coated with a solution of light-sensitive material, constituted as follows:

| | Parts by Weight |
|---|---|
| Light-sensitive diazonium salt of phosphotungstic acid and para diazo diphenylamine monomer | 4 |
| Resinous copolymer of vinylidene chloride-acrylonitrile, (available commercially as "Saran F–220") | 1 |
| Hydrochloric acid (concentrated) | .03 |
| Monomethyl ether of ethylene glycol (available commercially as methyl "Cellosolve" solvent) | 146.5 |

The light-sensitive diazonium salt is prepared in the following manner: In one vessel 1342 grams of para diazo diphenylamine sulphate are dissolved in 17 gallons of warm water (approximately 140° F.). This solution is then filtered to remove undissolved material.

In another vessel 4473 grams of 1:12 phosphotungstic acid is dissolved in 3.5 gallons of unheated water. This solution is then added with stirring to the diazo solution. A precipitate is formed, indicating formation of the insoluble complex diazonium salt of the diazo monomer and the phosphotungstic acid. The reaction is allowed to go to completion, usually requiring about one hour. The precipitate is recovered by filtration in a filter press, the cake obtained being washed with water until the pH of the wash water becomes constant. The washed filter cake is then dispersed in isopropyl alcohol until the filter cake changes from its yellowish color to an orange color. The dispersion is then filtered, the filtered cake is recovered, and then dried in an oven at 90° F. for about 24 hours.

The resultant diazonium salt is light-sensitive, and is insoluble in most common organic solvents.

In preparing the light-sensitive coating solution, the "Saran F–220" resin is dissolved in the methyl "Cellosolve," and to this solution is added the light-sensitive diazonium salt. The mixture is stirred until a fine suspension results, whereupon the hydrochloric acid is added to effect complete solution of the diazonium salt.

The resultant solution is stirred for about 15 minutes, and then is uniformly coated on the polyester film at a dry coating weight of approximately 23 milligrams per square foot. The coated film is gradually heated to approximately 150° F. in an oven to evaporate the solvent.

The light-sensitive surface is then overcoated with polyvinylformal containing a suitable transparent pigment, in this instance a phthalo cyanine pigment, e.g. "Monastral Blue BT 284–D." The coating solution is prepared by first dispersing the pigment into 1,1,2-trichloroethane solvent, and adding polyvinylformal resin, the amount of the ingredients being adjusted to yield a mix having 65 parts resin, 35 parts pigment, and 900 parts solvent. This mix is appropriately milled. The resultant mill base is then diluted by adding further solvent to yield approximately a 3 percent solution. This pigmented-resin coating solution or dispersion is applied over the dried light-sensitive layer at a dry coating weight of about 50–70 milligrams per square foot. The coated sheet construction is dried as before to evaporate the solvent.

All of the foregoing manufacturing operations take place under subdued light.

In the foregoing illustration, a cyan lithographic sheet was prepared. The companion magenta and yellow overcoated structures (which, together with the cyan sheet, constitute a complete three-color proofing system) were similarly prepared employing the same polyvinylformal overcoating, by using appropriately colored pigments, for example, "Watchung Red RT 761–D" and "Benzidine Yellow YT 564–D."

The resulting lithographic sheets are employed as color proofing film by exposing them (preferably by "back exposure" through the film backing) through the camera positive representing the corresponding color.

Following ultraviolet light exposure, each of the sheets is covered with a developer solution consisting of one part normal propyl alcohol and three parts of water (by volume) containing .3 percent wetting agent (such as "Aquarex D," a sodium sulfate of higher fatty alcohols). The sheet is then rubbed with a lithographic wiping pad to remove the over-coating and with it some or all of the exposed diazo in the non-image area. The sheets are then flushed with cold water and blotted dry. A positive half tone image results.

The resulting sheet is still light-sensitive in the colored areas. Also, the colored areas at this juncture do not represent the true color, inasmuch as the yellowish color of the light-sensitive diazonium material is quite apparent. The resulting sheets are therefore further treated to eliminate both the sensitivity and color of the light-sensitive layer.

To densensitize the previously non-exposed areas the sheets are fully exposed in an exposure frame. Each sheet is then immersed in a bleach solution for approximately one minute, following which it is washed, rinsed in cold water, and dried. The composition of a suitable bleach solution is as follows:

| | Parts by weight |
|---|---|
| Water | 82.60 |
| Sodium bisulfite | 0.99 |
| Dispotassium phosphate | 0.55 |
| Monopotassium phosphate | 2.76 |
| Isopropyl alcohol | 13.10 |

Following bleaching, the true colors of the sheets are exhibited, and their images correspond with the half tone images of the camera positives of the corresponding color separation.

When the three sheets are superposed in registry on a white background, an accurate proof is obtained of the three-color print, such as that which would result were the camera positives used to make printing plates from which color prints (called "Press Proofs") were made. Need for a press proof is greatly minimized or eliminated.

While the overcoating resin employed in this example was polyvinylformal, generally speaking any abrasion-resistant organophilic hydrophobic water-insoluble solvent-softenable resinous polymers are useful in place thereof. A number of such resins are disclosed in the aforementioned Larson application Serial No. 776,597, now Patent No. 3,136,637, granted June 9, 1964. It has been found, however, that when a resin overcoating is employed, as in the present example, an appropriate resin, such as the "Saran F–220" resin, should be employed in the light-sensitive layer to improve the bonding of (a) the light-sensitive intermediate layer to the film backing, and (b) the overcoating to the said intermediate layer.

The properties of the overcoating resin employed should be taken into account when selecting the resin to be incorporated into the light-sensitive layer, and vice versa. For example, the latter should be insoluble in the solvent to be employed for laying down the resin overcoating. (It generally must also be soluble in the solvent from which the diazonium complex is coated.)

The polyvinyl hydrogen phthalate resin employed in Example II is also useful in conjunction with the polyvinylformal overcoating resin, particularly in fine half tone reproductions, although the structure of the present example is preferred. Various other resins are useful, taking into account the foregoing teachings.

The amount of resin employed in the light-sensitive layer generally is minor in relation to the amount of light-sensitive diazonium complex present therein, but the relative amounts can vary widely. Useful sheets have been prepared where the ratio of resin to light-sensitive diazonium complex varies from 1:10 to about 2:1.

The amount of pigment employed in the resin overcoating is dictated chiefly by the desired color intensity to be achieved. However, by and large, the amount of pigment generally should not greatly exceed the amount of resin in the overcoating layer (on a volume basis). In the lithographic sheets of the present invention to be employed as color proofing film, the pigment should be transparent to visible light (so that the true depths of the colors will show through). The pigment need not be transparent to ultraviolet light, unless the sheet is to be front exposed.

A presensitized metal positively-acting lithographic printing plate as herein disclosed can be provided with a thin continuous hard durable overcoating over and in contact with the light-sensitive layer, the overcoating being composed predominantly of an organophilic hydrophobic water-insoluble solvent-softenable resinous polymer. In respect to such types of lithographic plates and other structures, see the Larson Patent No. 3,136,637, referred to above. The overcoating, specific embodiments of which also are disclosed above in connection with the lithographic sheets employed as color proofing film, generally speaking should contain no more than about 50% by volume of pigment.

Of course, where the overcoating is employed in a metal lithographic plate, the pigment must be transparent to ultraviolet light. Otherwise, the light-struck areas will not be rendered suitably soluble upon exposure of the plate.

I claim:

1. A presensitized metal positively-acting lithographic printing plate comprising a metal sheet having on at least one surface thereof an interaction product of said sheet and a poly-complex oxygenated anion of at least one metal selected from Groups Va and VIa of the Periodic Table, and overlying said interaction product a thin layer of a firmly bonded organophilic insoluble light-sensitive poly-complex oxygenated anion-diazonium salt, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

2. A presensitized metal positively-acting lithographic printing plate comprising a metal sheet having on at least one surface thereof an interaction product of said sheet and a heteropoly-complex oxygenated anion of at least one metal selected from Groups Va and VIa of the Periodic Table, and overlying said interaction product a thin layer of a firmly bonded organophilic insoluble light-sensitive diazonium salt of said heteropoly-complex and a light-sensitive diazo material, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

3. A presensitized metal positively-acting lithographic printing plate comprising a metal sheet having on at least one surface thereof an interaction product of said sheet and an isopoly-complex oxygenated anion of a metal selected from Groups Va and VIa of the Periodic Table, and overlying said interaction product a thin layer of a firmly bonded organophilic insoluble light-sensitive diazonium salt of said isopoly-complex and a light-sensitive diazo material, said diazonium salt being characterized in that it is ink-receptive and upon exposure of the plate to ultraviolet light through a transparency, decomposes in the light-struck areas to a material readily washed away, a firmly bonded image remaining in the non-light-struck areas of the plate.

4. A presensitized metal positively-acting lithographic printing plate comprising an aluminum sheet having on at least one surface thereof an interaction product of said sheet and poly-complex phosphotungstic acid, and overlying said interaction product a thin layer of a firmly bonded organophilic insoluble light-sensitive poly-complex phosphotungstate-diazonium salt, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

5. A presensitized metal positively-acting lithographic printing plate comprising an aluminum sheet having on at least one surface thereof an interaction product of said sheet and poly-complex phosphotungstic acid, and overlying said interaction product a thin layer of a firmly bonded organophilic insoluble light-sensitive diazonium salt of said phosphotungstic acid and a light-sensitive diazo resin, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

6. A presensitized metal positively-acting plate structure comprising a metal sheet having on at least one surface thereof an interaction product of said sheet and a poly-complex oxygenated anion of at least one metal selected from Groups Va and VIa of the Periodic Table, and overlying said interaction product a thin layer of a firmly bonded organophilic insoluble light-sensitive poly-complex oxygenated anion-diazonium salt, said diazonium salt being characterized in that it is organophilic and, upon exposure of the plate to ultraviolet light through a transparency, decomposes in the light-struck areas to a material readily washed away, a firmly bonded image remaining in the non-light-struck areas of the plate.

7. A presensitized metal positively-acting lithographic printing plate comprising a metal sheet having on at least one surface thereof an interaction product of said sheet and a poly-complex oxygenated anion selected from the group consisting of heteropoly-complex and isopoly-complex oxygenated anions, said anion further being of at least one metal selected from Groups Va and VIa of the Periodic Table, and overlying said interaction product a thin layer of a firmly bonded organophilic insoluble light-sensitive diazonium salt of a light-sensitive diazo material and a poly-complex oxygenated anion as above defined, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

8. A presensitized metal positively-acting lithographic printing plate comprising a metal sheet having on at least one surface thereof an interaction product of said sheet and a poly-complex oxygenated anion selected from the group consisting of heteropoly-complex and isopoly-complex oxygenated anions, said anion further being of at least one metal selected from Groups Va and VIa of the Periodic Table, and overlying said interaction product a thin layer of a firmly bonded organophilic insoluble light-sensitive diazonium salt of said poly-complex oxygenated anion and a light-sensitive diazo material, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate.

9. A presensitized positively acting lithographic sheet suitable for use in preparing color proofing film, comprising a clear transparent backing sheet having on one surface thereof a thin layer of a firmly bonded organophilic insoluble light-sensitive poly-complex oxygenated anion-diazonium salt, and containing an organophilic resin, and overlying said light-sensitive layer a thin, continuous, hard, durable coating composed predominantly of an organophilic hydrophobic water-insoluble solvent-softenable resinous polymer containing not more than about 50 percent by volume of pigment; said diazonium salt being characterized in that, upon exposure of said sheet to ultraviolet light through a transparency, it decomposes in the light-struck areas to a material which is readily washed away, said resin being soluble in a solvent for said diazonium salt and substantially insoluble in a solvent for said resinous polymer.

10. A presensitized positively acting lithographic sheet suitable for use in preparing color proofing film, comprising a clear transparent backing sheet having on one surface thereof a bonded layer consisting essentially of an insoluble light-sensitive diazonium salt of phosphotungstic acid and para diazo diphenylamine, and a copolymer of vinylidene chloride and acrylonitrile, and over said light-sensitive layer a coating of pigmented polyvinylformal resin.

11. A presensitized metal positively-acting lithographic printing plate comprising a metal sheet having on at least one surface thereof an interaction product of said sheet and a poly-complex oxygenated anion selected from the group consisting of heteropoly-complex and isopoly-complex oxygenated anions, said anion further being of at least one metal selected from Groups Va and VIa of the Periodic Table, and overlying said interaction product a thin layer of a firmly bonded organophilic insoluble light-sensitive diazonium salt of a light-sensitive diazo material and a poly-complex oxygenated anion as above defined, and containing an organophilic resin, said diazonium salt being characterized in that it is ink-receptive and, upon exposure of the plate to ultraviolet light through a transparency, decomposes in the light-struck areas to a material readily washed away, a firmly bonded image remaining in the non-light-struck areas of the plate, and over and in contact with said light-sensitive layer, a thin, continuous, hard, durable coating composed predominantly of an organophilic hydrophobic water-insoluble solvent-soluble resinous polymer containing not more than about 50 percent by volume of pigment, said pigment being transparent to ultraviolet light.

References Cited by the Examiner

UNITED STATES PATENTS 3,136,637 6/64 Larson -------------- 96—33 X

NORMAN G. TORCHIN, *Primary Examiner.*